July 29, 1969 H. OHNSORGE ET AL 3,458,654

CIRCUIT

Filed July 2, 1965 2 Sheets-Sheet 1

INVENTORS
Horst Ohnsorge &
Ulrich Haller
BY Spencer & Kaye
ATTORNEYS

INVENTORS
Horst Ohnsorge &
Ulrich Haller

BY Spencer & Kaye

ATTORNEYS 3,458,654

CIRCUIT

Horst Ohnsorge and Ulrich Haller, Ulm (Danube), Germany, assignors to Telefunken Patentvertungsgesellschaft m.b.H., Ulm (Danube), Germany Filed July 2, 1965, Ser. No. 469,276

Claims priority, application Germany, July 2, 1964, T 26,501

Int. Cl. H04l *15/34, 15/24, 17/16*

U.S. Cl. 178—23 9 Claims

The present invention relates generally to the data transmission field, and, more particularly, to a system of secured data transfer with automatic adaptation to the transmission time of the transmission system, wherein the information is transferred in blocks and continuously to a remote receiver which forms an accurate reception confirmation (ARC) signal for each block which is accurately received and transmits this signal over a return channel to the transmitter.

It should be understood at the outset that when ARC signal is used herein, what is meant is accurate reception confirmation. Also, L is used to represent binary "ONE."

The quality of a data transfer system depends on the accurate relative information flow which can be achieved. Accuracy necessitates the transfer of information without alteration. A high relative information flow, which is desirable, requires transmission of data without additions, if possible.

Fundamentally, two kinds of error correction are known in data transmission systems; error checking with correction by reconstruction and error checking with correction by repetition. With the first kind mentioned, the information to be transmitted is provided with so many redundant digits that, in the event of erroneous transmission, reconstruction is possible at the receiving end. The relative information flow is low, however, because of the number of redundant digits. With error checking with correction by repetition, the checking can be effected at the receiving end or at the transmitting end. In both these checking methods, a return channel is needed for the transmission of check information or of decision signals from the receiver to the transmitter. Examples of correction by repetition are the arrangements disclosed in co-pending applications Ser. No. 432,345, filed Feb. 12, 1965, for Circuit Arrangement, now abandoned, and Ser. No. 436,184 filed Mar. 1, 1965, for Transmission System, now U.S. Patent No. 3,413,600.

The use of a return channel can be avoided by means of a transmission by the single-channel half-duplex method. In this case, however, the relative information flow is reduced. Checking at the transmitting end permits the transfer of the pure information without check information. Some or all of the information, or a derivative therefrom, is returned to the transmitter over the return channel, and a decision regarding the freedom from error is reached by the transmitter. The necessary allocation of the check information and the differentiation between old and repeated information at the receiving station necessitate large equipment expenditures in order to carry out this method. With checking at the receiving end, check information is added by the transmitter to the information to be transmitted, and at the receiving end a repetition criterion is produced by deriving the same check information from the full information and comparing the two sets of check information.

It is known for the receiver to call for the information in blocks from the transmitter by means of signals. Since the signal from the receiver, which causes the transmission of a fresh block, is a signal reporting the accuracy of the preceding block, time for the transfer is lost between the transmission of two blocks even in the event of undisturbed transmission, this time being equal to the loop transmission time of the system. The loop transmission time is understood to mean the transmission time of the signals over the information carrying or transmission channel, over the return channel and in the receiver. Limits are imposed on the formation of larger blocks by the relative error frequency.

It is also known to have the transmitter continuously transmit the information and to interrupt this operation only when an error is reported by the receiver in order to initiate a repetition. The transmitted information has to be assembled into a repeat block at the transmitting station. In view of the maximum possible loop transmission time, this repeat block comprises a plurality of blocks. In a known method which is disclosed, for example, in German Patent No. 1,154,657, a sequence number is allocated to each block transmitted and also to each block included in a repeat block for identification in case of repetition. The evaluation of this sequence number when there is repetition necessitates a large technical expenditure. Moreover, the addition of the sequence number to each block reduces the relative flow of information.

With this in mind, it is an object of the present invention to provide a transmission system which can be constructed at lower cost than known transmission systems.

It is another object of the invention to provide such a system which achieves the shortest time loss when there is repetition, taking into account the signal loop transmission time.

These objects and others ancillary thereto are accomplished in accordance with preferred embodiments of the invention wherein pulses are counted by a counter at the transmitting station within a period of time which is determined by the beginning of a transmission and the arrival of the first ARC (accurate reception confirmation) signal. The number of these pulses is proportional or substantially proportional to the number of transmission timing pulses produced in the same period of time.

After the absence of one or more ARC signals, transmission is interrupted and a repeat signal is formed. The information transmitted from a first transmitter storage is simultaneously transferred to a second transmitter storage. Both storages are constructed in the form of a shift register and are arranged to be connected with feedback to form a ring circuit.

Subsequent to the issuance of the repeat signal and after elimination of those blocks which have been acknowledged by the receiver to be correct, by evaluating the state of the counter, all of the information to be repeated is shifted out from the second transmitter storage into the first transmitter storage. From here it is again transmitted to the receiver after the transmission of the repetition signal. After the detection of a first mutilated block, the receiver interrupts the acceptance of information until it receives a repetition signal from the transmitter.

Thus, after the first ARC signal has been given, the state of the counter is proportional to the total signal transmission time of the outgoing and return channel including the processing time in the receiver. On the other hand, since one bit is transmitted to the receiver with each transmission timing pulse, the state of the counter simultaneously indicates a proportional value in relation to the number of bits which have been transmitted by the transmitter since the transmission of a block causing an ARC signal, including the bits in this block, up to the time when this ARC signal arrives at the transmitting station. If the proportionality factor between the state of the counter and the number of bits transmitted is selected as 1, then the state of the counter corresponds directly to the number of bits transmitted in this period of time.

In the event of repetition, therefore, the state of the counter indicates how many of the bits present in the auxiliary storage, viewed from its input, have to be again transmitted to the receiver. Since the number of cells in the second transmitter storage is known, the identification of the bits to be repeated is as easy as can be imagined. The fact that a plurality of blocks are repeated by the transmitter in the case of repetition, does not cause any great loss of time. This is due to the fact that in a high proportion of all disturbances, a plurality of successive blocks are always mutilated, as extensive measurements have shown. This is caused by intruding disturbance voltages in the information channel, the duration of which may amount to one second. The duration of the disturbance is therefore great in comparison with the time which is needed for the transmission of a block. The technical expenditure for carrying out the system is low in comparison with the methods previously known.

According to the invention, provision is preferably made for the counter to be moved back by a number proportional to the number of bits in a block on the arrival of each ARC signal from the receiver, and for means to be provided for synchronizing the ARC signal with the transmission timing pulse. If the transmission time of the transmission path is constant, there is a number of transmitted bits, determined by the block length, between each ARC signal $n$ and the following one $n+1$. If the interval in time between ARC signals arriving at the transmitter varies, this must be attributed to fluctuations in transmission time in the transmission path. Since the counter continues to count in the forward direction in proportion to the transmission timing pulses emitted between two ARC signals $n$ and $n+1$, and is set back by a number proportional to the number of bits in a block on the arrival of the ARC signal $n+1$, the counter indicates the particular transmission time of the transmission path after each setting back and hence after each ARC signal has been given. Thus, even with extreme fluctuations in transmission time, such as are possible with transmissions over long distances, a clear identification of bits to be repeated is assured. Despite the additionally required setting back of the counter, there is a simplification in the electronic control means in the transmitter, because in the event of a repetition, due to the setting back of the counter, there is no need to search for the beginning of the first block to be repeated.

Additional objects and advantages of the present invention will become apparent upon consideration of the following description when taken in conjunction with the accompanying drawings in which.

Figure 1:
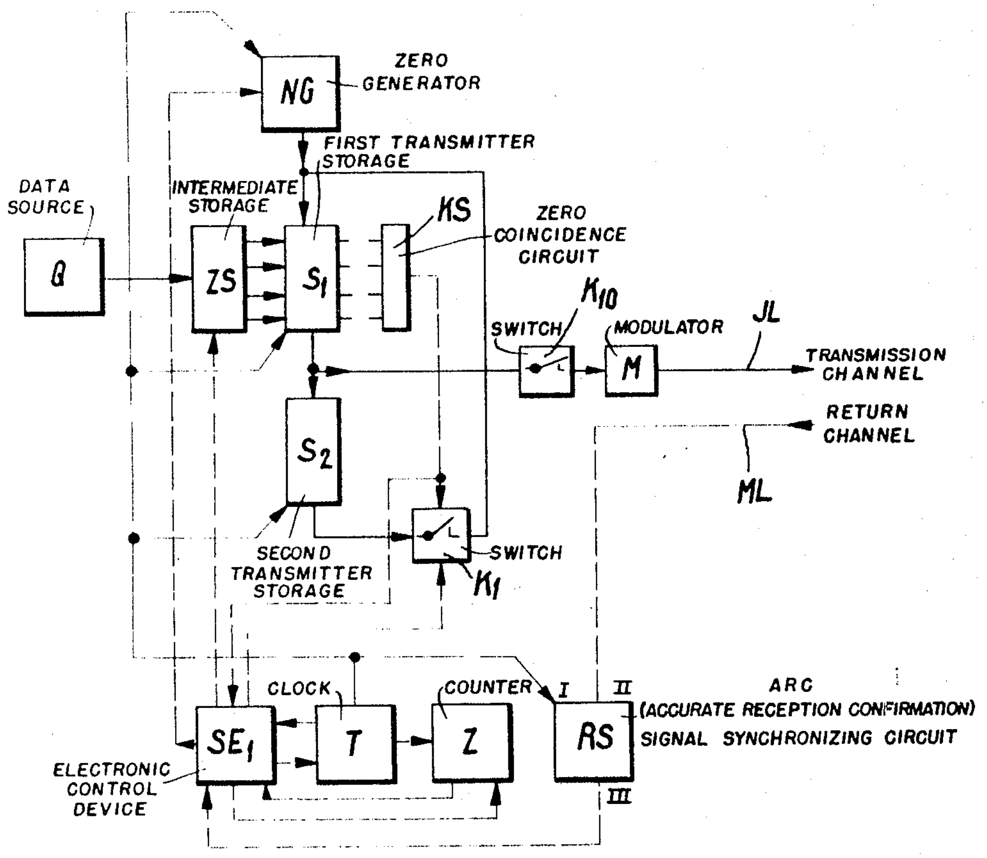
FIGURE 1 is a block diagram of the transmitter of the transmission system.
Figure 2:
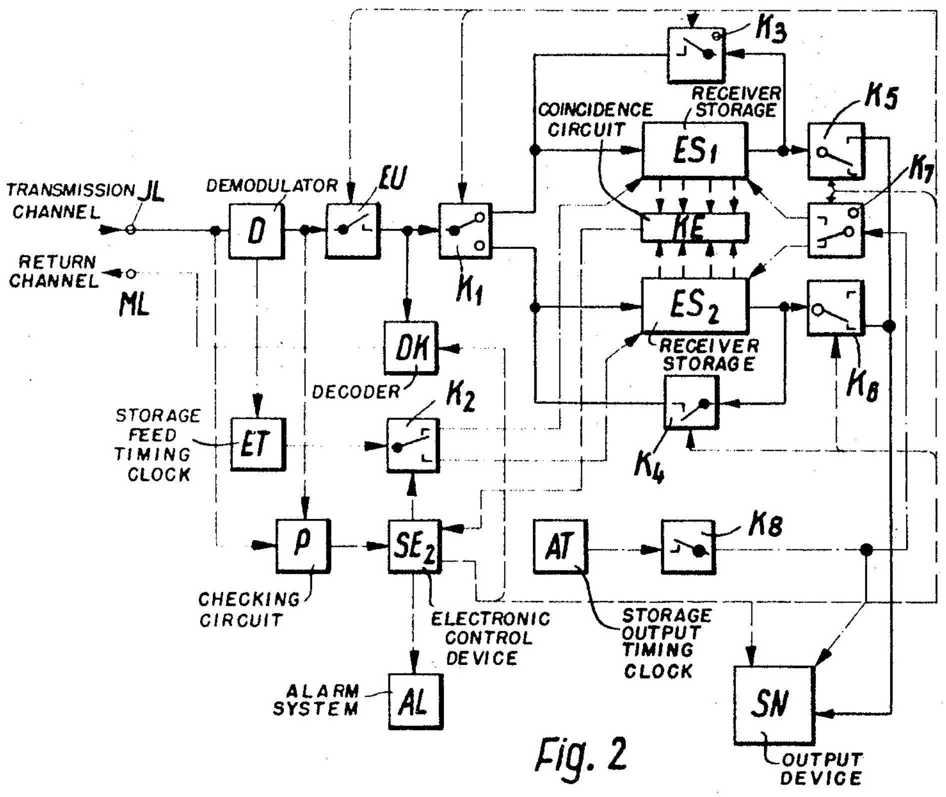
FIGURE 2 is a block diagram of the receiver of the transmission system.

With more particular reference to the drawings, FIGURE 1 shows a data source Q and a transmitter, and in FIGURE 2 a receiver is shown as is an output device SN. The transfer system so formed works on the principle of checking at the receiving end. The information which is transmitted continuously in the form of blocks from the transmitter contains redundancy in the form of check information. The incoming information is examined for accuracy in known manner at the receiver by means of a decoder DK, using the check information which is also transmitted, and if a block is found to be accurate, an ARC signal is sent to the transmitter through a return channel ML. The information, modulated by means of a modulator M is transmitted by the transmitter over a transmission channel JL to the remote receiver. Here, the redundant information is examined for freedom from mutilation by a checking circuit P before being decoded.

The transmitter will first be considered with reference to FIGURE 1. The information from the source Q is transferred through intermediate members, in which the check information is added, into intermediate storage ZS, from which it is transferred in parallel, under the control of an electronic control device $SE_1$, to first transmitter storage $S_1$. The instantaneous contents of the intermediate storage ZS form one block. The transfer to the first transmitter storage $S_1$ is effected between two transmission timing or clock pulses of a timing or clock pulse generator T. After a block from the intermediate storage ZS has been transferred into the first transmitter storage $S_1$, the bits of this block are successively supplied to the modulator by means of the transmission timing pulse and at the same time they are shifted into a second transmitter storage $S_2$. The second transmitter storage $S_2$, like the first transmitter storage $S_1$ is constructed in the form of a shift register.

It is also possible to combine the first transmitter storage $S_1$ and the second transmitter storage $S_2$ structurally to form a single shift register. In this case, the first cells following the serial input, namely, as many as there are bits in a block, are allocated to the first transmitter storage, and the remaining cells are allocated to the second transmitter storage $S_2$. The output of the second transmitter storage $S_2$ can be fed back to the serial input of the first transmitter storage $S_1$ through a switch $K_1$. This renders possible shifting of the contents of the transmitter storage $S_2$ into the transmitter storage $S_1$. The transmitter can be supplied by the pulse generator T with timing pulses at a normal frequency and with timing pulses at a higher frequency. In the event of undisturbed transmission, it emits timing pulses at a normal frequency.

At the beginning of a transmission, a data block comprising zeros is supplied from the transmitter storage to the modulator M. This is immediately followed by the transmission of a first data block. All transmission timing pulses, beginning with the first bit of the zero-block, are counted by a counter Z. The zero-block enables the receiver to recognize the beginning of a transmission. If the data blocks are recognized as being accurate by the receiver, this delivers an ARC (accurate reception confirmation) signal to the transmitter over the return channel ML after each block. Every ARC signal causes the counter Z to be set back by the number of bits in a block by means of an electronic control device $SE_1$. This setting back is effected by counting in the backward direction at a higher timing pulse frequency. It is sufficient for the frequency of the counting-back timing pulses to be higher than the frequency of the transmission pulses. In any case, however, synchronization is necessary between the ARC signals and the transmission timing pulses. For this purpose, an ARC-signal synchronizing circuit RS is provided which only passes on an ARC signal to the electronic control device $SE_1$ after the termination of a transmission timing pulse emitted simultaneously therewith or following it. In this manner, one complete timing pulse interval is available for the counting backwards by the counter Z through the electronic control device. The second transmitter storage $S_2$ has a minimum storage capacity corresponding to the information which is transmitted by the transmitter during the maximum loop transmission time of the whole data transfer system.

In the case of undisturbed transmission, the feedback switch $K_1$ is open and the information shifted out of the transmission storage $S_2$ is lost. The absence of an ARC signal may be evaluated by the electronic control device $SE_1$ as a report of a block having been erroneously received in the receiver, that is to say, an error signal. In the example, however, the absence of $i+1$ successive ARC signals, after a first ARC signal has been given, is selected as a repeat criterion. If $i$ ARC signals are absent after the reception of one ARC signal, however, and if another ARC signal then arrives, this then causes the counter to count backwards by the number of bits in $i+1$ blocks. Only the ARC signals comprise coded electrical signals. Absent ARC signals, on the other hand, are evaluated by the transmitter as error signals. In this manner, additional electronic equipment for the formation of an error signal is saved in the receiver. After a mutilated block has been received, the receiver does not deliver any more ARC signals until it receives a repetition signal from the transmitter, and the transmitter does not receive any more ARC signals from the receiver. In this case, the ARC signal $i+1$ is also absent and the repetition is initiated.

The reliability of detecting the ARC signals can be increased as desired by the expenditure of further time, that is to say, by an increase of the value of $i$. This expenditure of time, that is to say the resulting redundancy expenditure, only has to be made, however, in the case of repetition. In every case in which an error signal occurs, the transmission timing pulse and hence the transmission of further bits is interrupted by the opening of a switch $K_{10}$, and the data output of the source Q to the intermediate storage ZS as well as the transfer of further blocks from the intermediate storage ZS to the first transmitter storage $S_1$ ceases. A resetting of the counter does not take place. The state of the counter now indicates the number of bits which have been transmitted since the transmission of the mutilated block, including the bits in this block, up to the detection of the error signal. Then the timing pulse generator T emits as many pulses at a higher frequency as are required to cause the counter to assume a counting state corresponding to the number of store cells in the second transmitter storage $S_2$. Then the first bit to be repeated is actually in the last store cell ahead of the serial output. At the same time, all the store cells in the first transmitter storage $S_1$ are filled with zeros by a zero generator NG at the same higher timing pulse frequency.

After the termination of this operation, the switches $K_1$ and $K_{10}$ close. From now on, timing pulses are emitted at normal frequency. All the bits from the first and the second transmitter storage are then shifted once in a circle. During this operation, the block of zeros which serves as a beginning-of-repetition signal in the receiver, is transmitted first, followed by all the information bits to be repeated. Between the transmission of the zero block and the repeated information, the counter Z is set to zero. A zero-coincidence circuit KS which covers all the storage locations in the transmitter storage $S_1$, determines the termination of the cyclic shift (or end-around shift) and hence the termination of the repetition and, through the electronic control device, causes the opening of the feedback switch $K_1$ and the supply to the intermediate storage and to the first transmitter storage, respectively, of fresh information from the source Q.

If a repetition signal, which comprises a zero block, does not meet the reliability requirements with regard to its recognition, then during the time which elapses from the closing of the switch $K_1$ until the first bit to be repeated has reached the serial output of the first transmitter storage, a special repetition signal can be transmitted by a separate circuit. In this case, the switch $K_{10}$ should only be closed after the transmission of the repetition signal has been completed, in order to suppress the zero block. The formation of the repetition signal can then be effected by one of the known methods. The special repetition signal consists of a data block, the bit configuration of which is known to the receiver. Apparatus to generate such special repetition signals are described for instance in co-pending application Ser. No. 404,111, filed Oct. 15, 1964, for Transmission Method and Apparatus. Furthermore, the special repetition signal may be transmitted with changed modulation mode as described for instance in co-pending application Ser. No. 404,059, filed Oct. 15, 1964, for Transmission. If a special repeat block is transmitted, this can be passed on to the output device of the receiver as an identification signal. If the very first block in a transmission or in a repetition transmission is mutilated, the transmitter does not receive an ARC signal from the receiver. The counter Z is not set back. Instead, this continues to count up to a defined number of transmission timing pulses and after this number has been reached, it causes an interruption of the transmission through the electronic control device $SE_1$.

The state of the counter for the interruption of the transmission is preferably selected in such a manner that, when the state of the counter is reached, a whole block is transmitted from the transmitter storage and this only contains zeros. If the number is further selected in such a manner that it corresponds to the number of cells in the auxiliary storage $S_2$, then a forward shift of the information to be repeated as far as the output of the auxiliary storage at a high timing pulse rate is not required before the feedback switch $K_1$ is closed. The interruption of the transmission is effected as a result of the absence of the instruction from the electronic control device $SE_1$ for the transfer of a block from the intermediate storage ZS to the transmitter storage $S_1$. At the same time, the electronic control device also causes the closing of the feedback switch $K_1$. The transmission timing pulses continue at the normal frequency, however, and so change over immediately from transmission to repetition. This method of avoiding the forward shift of the information in the auxiliary storage $S_2$ by means of rapid timing pulses can also be used when the absence of $i+1$ successive ARC signals following a first ARC signal is used as a repetition criterion.

The receiver of the transmission system will now be explained with reference to FIGURE 2. The individual devices in the receiver are switched on by a continuous sequence of LLLLL, which is delivered by the modulator of the transmitter. After the individual devices in the transmitter are switched, on the modulator M (FIG. 1) receives in accordance with reference [17], a continuous signal LLLL . . . ("marking condition" on circuit 3, see p. 71 in [17]), as long as no information bits will be transmitted. In accordance with this continuous signal the modulator M transmits a modulated signal to the demodulator D (FIG. 2). The demodulator D derives a continuous signal LLLL . . . , corresponding to the continuous signal in the transmitter, from the received modulated signal (see circuit 4 p. 71 in [17]). In order to recognize the beginning of a normal information transmission as well as of a repetition, both of which are indicated by the transmitter by the transmission of a block of zeros, the checking circuit P is provided in the receiver. This circuit also examines the incoming information for freedom from multilation before or after demodulation at demodulator D. After demodulation, the data blocks pass alternately, in the sequence of their arrival, into the two receiver storages $ES_1$ and $ES_2$.

After the bits of a block have been stored, the decoder checks them for accuracy by means of the redundancy bits contained in the block. If no error is detected, and if the checking circuit P has not delivered a multilation signal to the elecrtonic control device $SE_2$ during the time of receiving the block, the block is delivered from the receiver storage $ES_1$ or $ES_2$ containing it to the output device SN and an ARC signal is delivered to the transmitter. While the information is being extracted from the one receiver storage, the next block received passes into the other receiver storage. This alternating block method necessitates continuous and alternate switching over of the storage supply lines between the two receiver storages $ES_1$ and $ES_2$ in the rhythm of the arrival of the blocks at the receiver. If, for example, an incoming block $n$ is conveyed through the switch $K_{11}$ into the storage $ES_1$, then the bits of the blcok $n-1$ are delivered through the switch $K_6$ to the output device SN at the same time. The storage-feed timing clock ET delivers a pulse derived in the receiver from the information and likewise passes to the storage $ES_1$ through the switch $K_2$. The output of the information contained in the receiver storage to the output device SN can be effected at a frequency different from the storage-feed timing pulses. A separate storage-output timing pulse generator AT is therefore provided to produce the storage-output timing pulses. By means of the switch $K_7$, the timing pulses of this generator are supplied alternately to the storages $ES_1$ and $ES_2$, in each case to that one in which the storage is not being effected. After each output of a block, the storage-output timing pulses are interrupted by means of the switch $K_8$ and only supplied again by the ARC signal of the next block.

For example, if the storage of a block $n$ in the storage $ES_1$ and its checking are terminated, all the switches change over. The block $n$ is then delivered from the storage $ES_1$ to the output device SN and a block $n+1$ is fed into storage $ES_2$. The contents of the particular storage which are just supplied to the output device, are fed back to its storage input by the feedback switches $K_3$ and $K_4$ which are allocated to the storages $ES_1$ and $ES_2$. In this manner, the contents of the last block read out in each case are retained and serve as a comparison block in the event of repetition.

The switching over of all the switches takes place at a frequency which corresponds to the frequency of the incoming blocks per second, and is effected by the electronic control device $SE_2$. A circuit KE is allocated to the two storages $ES_1$ and $ES_2$ to deliver a coincidence signal in the event of coincidence between the contents of the two storages at certain times. If the checking circuit P has detected the beginning of transmission, then all stages of both storages are set to zero and the zero block received is fed into the one of the two storages. If the coincidence circuit KE emits a coincidence signal after the stroage of the zero block, the normal receiving operation is initiated. From now on, the decorder delivers an ARC signal to the transmitter for each block which is correctly received. In the event of an error, the receiver interrupts the acceptance of information by means of its switch EU and only closes this switch again when it has received a repetition signal from the transmitter by means of the checking circuit P.

The information of the last block received correctly is retained in one of the two storages $ES_1$ or $ES_2$. After the reception of the repetition signal from the transmitter, the information blocks which now arrive are successively shifted into the free reception storage, and after each block has been stored, a check is made as to whether the contents of both storages coincide. If there is coincidence, then the block following the block producing coincidence is the first one repeated.

This method of detecting the beginning of the repeated information presupposes that the electronic control device $SE_1$ in the transmitter is organized in such a manner that, with the aid of the counter Z at least one more block is repeated before the block marked by the error signal. This is ensured in such a manner that the receiver only delivers an ARC signal for the blocks of information which are received correctly and not for the blocks which are necessary for synchronization, and that the counter Z in the transmitter counts the bits of all the blocks transmitted with the exception of the repetition signal. This method of identifying the beginning of the repeated information ensures the greatest reliability, even if the first repeated information block, which serves a coincidence block in the receiver, had been disturbed during the transmission.

After the emission of a coincidence signal by the circuit KE, the receiver again works normally. If the receiver can not detect coincidence between the contents of the two storages during a defined number of blocks after a repetition signal, it then waits for the next repetition signal from the transmitter. This is possible because the transmitter again does not receive any ARC signal and, as a result, it likewise initiates the repetition again after a defined number of blocks have been transmitted. If no coincidence is established between the two receiver storages $ES_1$ and $ES_2$ after a repeat signal has been received at least twice, an alarm system AL is set in operation and indicates that the transmission must be started afresh.

Figure 3:
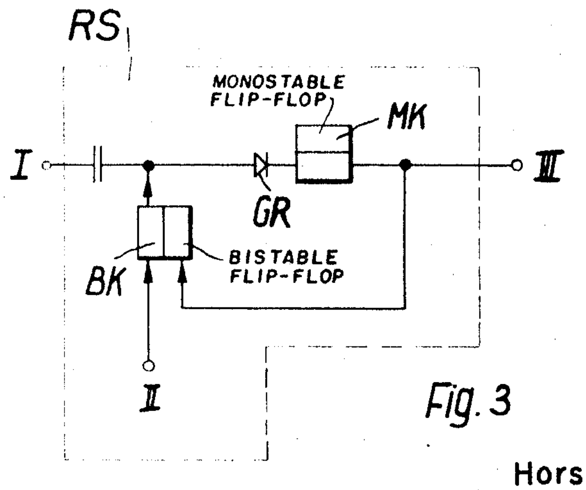
FIGURE 3 is a circuit diagram of an arrangement for synchronizing the transmission timing pulses with the ARC signals arriving at the transmitter.

FIGURE 3 illustrates a possible embodiment of the ARC signal synchronizing circuit RS of the transmitter. In it, BK is a bistable flip-flop stage, MK a monostable flip-flop stage, I is a connecting point for the transmission timing pulses, II a connection point for the ARC signal coming from the receiver, and III a connecting point from which the ARC signal synchronized with the transmission timing pulses is derived. An ARC signal arriving at the transmitter sets the bistable flip-flop stage BK in such a manner that the timing pulse following the mentioned signal energizes the monostable flip-flop stage through a diode GR which is otherwise blocked by the bistable flip-flop stage BK. With the trailing edge or flank of its output pulse, this monostable flip-flop stage restores the bistable flip-flop stage BK to its normal state and in addition initiates the resetting of the counter Z. This can be caused to count backwards at a very rapid rate in a single interval between two timing pulses. A frequency of the backward counting timing pulse which is somewhat higher than the transmission timing pulse frequency is, however, sufficient. If a transmission timing pulse appears during the counting backwards, the counting backwards is interrupted for the duration thereof and the timing pulse is counted off in the counter in the forward direction.

If different sources and output devices are to cooperate, it is important that the information should only be transmitted by the transmitter after the receiver and the output device have become ready for operation. It is equally important that the readiness of the output device for operation should also be supervised during the data transmission. This is achieved in such a manner that, after the transmitter and receiver have been switched on and after the two have been brought into synchronism, the output device SN emits a ready-for-operation signal. This is transmitted to the transmitter as an ARC signal. In the transmitter, this first ARC signal sets the normal operation of information transfer in operation. In this case, the first ARC signal which arrives must not set the counter Z back. Furthermore, provision must be made in the receiver for the decoder DK only to be able to deliver ARC signals to the transmitter during the information transmission, when the output device SN is ready to receive information. If the capacity of the output device SN is exhausted or if the output device SN has failed mechanically, for example by jamming in the case of punched-tape receivers, the transmitter initiates the repetition of information after the absence of a defined numbet of ARC signals. The repeated information is accepted by the receiver if the output device has again become ready for operation at the arrival of the first or the following repetition signals. If its readiness for operation is interrupted for a prolonged period then the repeated occurrence of the repetition signal actuates the alarm system AL.

Thus, the data transfer system has high flexibility with respect to the reliability required and adaptation to various kinds of sources and output devices.

APPENDIX

In the precedent description the function of the various blocks is explained. In the following section the construction of these blocks is described as far as necessary.

(1) Data source Q (FIG. 1)

Data sources are devices to deliver informations, such as apparatus reading binary information out of data storages, for instance punched-tape emitters, punched-card readers, magnetic tape readers etc., furthermore output channels of computers.

(2) Output device SN (FIG. 2)

Output devices are devices to receive information for storage or further evaluation. Storage devices are such as punched-tape receivers, punched-card receivers, magnetic tape recorders and so on. Blocks for further evaluation are such as input channels for computers. Electrooptical indicators, such as symbol indicating tubes too, may be output devices.

In the output devices mentioned means are employed to indicate readiness for use and to indicate the exact functioning of the output device under consideration. Only when readiness for use is indicated ARC-Signals will be transmitted.

(3) Intermediate storage ZS (FIG. 1)

The electronics of the intermediate storage ZS consist of a shift register, that is to receive the bits delivered by the data source Q. Transistor flip-flop shift registers are described in [1] for instance.

The intermediate members, mentioned on column 3, line 75 of the precedent specification, are constructed as encoders as described in [2] for instance.

(4) Shift registers $S_1$, $S_2$, (FIG. 1); $ES_1$, $ES_2$ (FIG. 2)

The first and second transmitter storages $S_1$, $S_2$ (FIG. 1) and the receiver storages $ES_1$, $ES_2$ (FIG. 2) are shift registers as described for instance in [3], [4].

(5) Clock T (FIG. 1)

Is a known oscillator such as astable multivibrator, blocking oscillators and so on as described for instance in [3], [5], [6].

(6) Counter Z (FIG. 1)

The forward-backward counter Z is constructed as described for instance in [4], [7]. The signal for the mode "backward-counting" is delivered to the counter Z by the electronic control device $SE_1$. The evaluation of the state of the counter is executed by means of known diode logic devices as described for instance in [1], [8], [9], [10.]

(7) Zero generator NG (FIG. 1)

The zero generator is an electronic switching device which is controlled by the electronic control device and delivers a voltage. On closing the switch, the voltage mentioned delivers a zero-bit 0 to the first transmitter storage $S_1$ at each clock pulse.

(8) Switches

All switches $K_1$, $K_{10}$ (in FIG. 1) and $K_2$, $K_3$, $K_4$, $K_5$, $K_6$, $K_7$, $K_8$, $K_{11}$ (in FIG. 2) are electronic diodelogic switches such as AND—circuits as described for instance in [3], [4].

(9) Electronic control device $SE_1$ (FIG. 1)

The electronic control device consists of known circuit components, combined in such a manner that the functional cooperation of the electronic control device will be assured. Therefore, it contains bistable and monostable flip-flops, and logic circuits, such as AND- and OR-Circuits. To permit the control of the encoder and the intermediate storage ZS, the control device contains a binary counter, counting the bits delivered by the data source Q. In general the electronic control device is a sequential control switch device as described for instance in [1], [3], [4], [8], [9], [10].

(10) Zero coincidence circuit KS (FIG. 1), coincidence circuit KE (FIG. 2)

These circuits are constructed as diode-logic circuits as described for instance in [8], [9], [10], [11].

(11) Modulator M (FIG. 1), demodulator D (FIG. 2).

In the modulator M the binary informations are modulated upon a carrier voltage. In the demodulator D the informations are regenerated from the carrier voltage received. For instance [12].

(12) Storage feed timing clock ET (FIG. 2)

The storage feed timing clock is a pulse generator synchronized by means of the received signals. For instance [4], [13], [14].

(13) Storage output timing clock AT (FIG. 2)

Is a pulse generator as described for instance in [3], [5], [6].

(14) Checking circuit P (FIG. 2)

The checking circuit P comprises a circuit for detecting repetition signals as described for instance in copending applications, Ser. No. 404,111, filed Oct. 15, 1964, for Transmission Method and Apparatus, and Ser. No. 404,059, filed Oct. 15, 1964, for Transmission. Furthermore the checking circuit comprises a detector as described for instance in [14], [15].

(15) Decoder DK (FIG. 2)

Is a circuit as described for instance in [2].

(16) Alarm system AL (FIG. 2)

The alarm system AL consists mainly of a binary counter fed with a counting pulse for each repetition signal received. By means of a logic circuit a signal will be derived when a certain state of the counter is exceeded. This signal causes an optical or acoustic alarm. Each ARC-Signal delivered resets the counter to zero.

(17) Electronic control device $SE_2$ (FIG. 2)

The essential points mentioned under 9) for $SE_1$ apply equally for this circuit. The $SE_2$-binary counter counts the received bits and causes the control of the decoder DK and of the receiver storages $ES_1$, $ES_2$ by means of logic circuits.

References

[1] A. I. Pressman, Design Transistorized Circuits for Digital Computers, New York, 1959.

[2] W. W. Peterson, Error Correcting Codes, New York, London, 1961.

[3] R. Richards, Digital Computer Components and Circuits, New York, 1957.

[4] Millman, Taub, Pulse and Digital Circuits, New York, 1956.

[5] Transistor Circuit Engineering, ed. by R. F. Shea, New York, London, 1957.

[6] Principles of Transistor Circuits, ed. by R. F. Shea, New York, London, 1953.

[7] L. Trent, A Transistor Reversible Binary Counter, Proc. Nat. Electronics Conference, Chicago 8(1952) S. 346–357.

[8] R. Richards, Arithmetic Operations in Digital Computers, New York, 1955.

[9] M. Phister, Jr., Logical Design of Digital Computers, New York, 1958.

[10] S. H. Caldwell, Switching Circuits and Logical Design, New York, 1958.

[11] S. E. Gluck et al., The Design of Logical Or-AND-Or Pyramids for Digital computers, Proc. IRE, vol. 41/2 (1953), pp. 1388–1392.

[12] CCITT Contribution, Com. Sp. A. No. 75–E.

[13] J. P. Costas, Synchronous communications, Proc. IRE (1956), pp. 1713–1718.

[14] Edson et al., Synchronized Clocks for Data Transmission, Electronics No. 40 (January 1959), S. 832–836.

[15] Harri set al., Optimum Decision Feedback Systems, IRE Nat. Conv. Rec. (1957), pt. 2, p. 3.

[16] Bloom et al, Improvement of Binary Transmission by Null-Zone Reception, Proc. IRE, vol. 45 (1957), pp. 964–975.

[17] CCITT-Contribution, Comp. Sp. A. No. 92, E.

It will be understood that the above description of the present invention is susceptible to various modifications, changes and adaptations

What is claimed is:

1. A system of secure data transmission [with automatic adaptation to the transmission time of the transmission channel] wherein the information is transferred in blocks, said system, comprising, in combination:

(A) a transmitter;

(B) a receiver;

(C) a transmission channel over which information is transmitted from said transmitter to said receiver;

(D) a return channel over which an accurate reception confirmation signal is sent from said receiver to said transmitter for each block which is received correctly;

(E) said transmitter including (1) a first transmitter storage having an information input and an information output (2) a second transmitter storage having an information input connected to the information output of said first transmitter storage and an information output connectable to the information input of said first transmitter storage (3) means for producing transmission timing pulses (4) counter means for counting pulses which are substantially proportional to the number of transmission timing pulses produced between the beginning of a transmission and the arrival of a first accurate reception confirmation signal (5) transmitter control means for (a) interrupting transmission and forming a repeat signal after the absence of at least one accurate reception confirmation signal (b) simultaneously connecting the output of said second transmitter storage with the input of said first transmitter storage (c) transferring a repeat signal and subsequently all blocks to be repeated from said second transmitter storage through said first transmitter storage to the transmitter and eliminating the blocks acknowledged as correct by the receiver by evaluating the state of the counter means; and (F) said receiver including (1) means for detecting mutilated blocks (2) means for interrupting the acceptance of information after the detection of a first mutilated block until it receives a repetition signal from the transmitter (3) means for forming an accurate reception confirmation signal for each block which is received correctly and for sending such a signal to the transmitter via said return channel.

2. A system as defined in claim 1 wherein on the arrival of each accurate reception confirmation signal from the receiver, the counter means is set back by a number proportional to the number of bits in a block, and means being provided for synchronizing the accurate reception confirmation signal and the transmission timing pulses; and said transmitter control means are arranged so that in the event of a first accurate reception confirmation signal, not having been given since the beginning of a transmission or a repeat transmission, at a moment when the counter means exceeds a predetermined counter state, the latter delivers a signal which initiates the repetition of all the bits transmitted from the beginning of the transmission or the repeat transmission up to this moment.

3. A system as defined in claim 1 wherein said transmitter storages are both shift registers and said transmitter control means are arranged so that the bits stored in the first transmitter storage are transmitted in series by by means of the transmission timing pulses and at the same time are transferred to the serial input of the second transmitter storage which contains at least as many store cells as there are bits transmitted between the beginning of a transmission and the reception of the first accurate reception confirmation signal.

4. A system as defined in claim 1 wherein said transmitter control means are arranged so that after the emission of a repeat signal, timing pulses at normal or a higher frequency are given out until the counter means reaches a specific counter state, the counter means is arranged to interrupt the timing pulses when the first bit to be repeated is in the last cell ahead of the serial output of the second transmitter storage, and after the arrival of the first bit to be repeated at the last cell in the second transmitter storage, the serial output of the second transmitter storage is fed back to the serial input of the first transmitter storage and then as many timing pulses are emitted at normal frequency as there are store cells in the first transmitter storage and during these pulses a repetition signal is transmitted from the transmitter to the receiver.

5. A system as defined in claim 4 wherein the counter means is set to zero before or after the emission of the repetition signal to the receiver.

6. A system as defined in claim 4 wherein an end-of-repetition signal is derived from the presence of like bits in all the storage cells of the first transmitter storage.

7. A system as defined in claim 6 wherein the end-of-repetition signal is initiated by means of a coincidence circuit.

8. A system as defined in claim 6 wherein the bits which are all alike are zeros.

9. A system as defined in claim 1 wherein the information is transferred in blocks and with a single timing pulse from an intermediate storage which is provided into the first transmitter storage, said transmitter control means interrupts the supplying of the intermediate storage with information during the whole repetition operation, and is arranged so that the supplying of the intermediate storage with information is interrupted by the repeat signal and after interruption is initiated again by the end-of-repetition signal.

References Cited

UNITED STATES PATENTS 2,988,596 6/1961 Dalen ------------- 178—23.1

THOMAS B. HABECKER, Primary Examiner

U.S. Cl. X.R.

178—69

PO-1050
(5/69)

UNITED STATES PATENT OFFICE
CERTIFICATE OF CORRECTION

Patent No. 3,458,654 Dated July 29, 1969

Inventor(s) Horst Ohnsorge and Ulrich Haller

It is certified that error appears in the above-identified patent and that said Letters Patent are hereby corrected as shown below:

In the heading of the patent, Column 1, lines 4 and 5, change "Patentvertungsgesellschaft" to --Patentverwertungsgesellschaft--. Column 6, line 52, change "elecrtonic" to --electronic--; line 64, change "blcok" to --block--. Column 7, line 26, delete "the" (first occurrence); line 28, change "stroage" to --storage--; line 58, after "serves" insert --as--. Column 10, lines 74 and 75 and Column 11, line 1, delete "[with automatic adaptation to the transmission time of the transmission channel]". Column 12, line 8, delete "by".

SIGNED AND
SEALED
MAY 26 1970

(SEAL)
Attest:

Edward M. Fletcher, Jr.
Attesting Officer

WILLIAM E. SCHUYLER, JR.
Commissioner of Patents